US012142140B2

(12) United States Patent
Shao et al.

(10) Patent No.: US 12,142,140 B2
(45) Date of Patent: Nov. 12, 2024

(54) METHODS AND SYSTEMS FOR MANAGING EXHAUST EMISSION IN A SMART CITY BASED ON INDUSTRIAL INTERNET OF THINGS

(71) Applicant: CHENGDU QINCHUAN IOT TECHNOLOGY CO., LTD., Sichuan (CN)

(72) Inventors: Zehua Shao, Chengdu (CN); Yuefei Wu, Chengdu (CN); Haitang Xiang, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 212 days.

(21) Appl. No.: 17/814,873

(22) Filed: Jul. 26, 2022

(65) Prior Publication Data
US 2023/0419823 A1   Dec. 28, 2023

(30) Foreign Application Priority Data
Jun. 28, 2022   (CN) .......................... 202210740751.1

(51) Int. Cl.
*G08G 1/00* (2006.01)
*G01C 21/34* (2006.01)
(Continued)

(52) U.S. Cl.
CPC ......... *G08G 1/012* (2013.01); *G01C 21/3492* (2013.01); *G06V 10/62* (2022.01); *G16Y 10/40* (2020.01); *G16Y 20/10* (2020.01)

(58) Field of Classification Search
CPC .... G08G 1/012; G01C 21/3492; G06V 10/62; G16Y 10/40; G16Y 20/10
See application file for complete search history.

(56) References Cited

U.S. PATENT DOCUMENTS

| 8,175,795 | B2 * | 5/2012 | Narita | B60W 40/12 |
| | | | | 701/1 |
| 10,226,982 | B2 * | 3/2019 | Alger | G06V 20/56 |
| | | (Continued) | | |

FOREIGN PATENT DOCUMENTS

| CN | 105426636 B | 9/2018 |
| CN | 110163449 A | 8/2019 |
| | (Continued) | |

OTHER PUBLICATIONS

Sun et al, "Urban traffic regulation and air pollution: A case study of urban motor vehicle restriction policy", Elsevier, Feb. 1, 2022, 10 pages.*

(Continued)

*Primary Examiner* — William L Bashore
*Assistant Examiner* — David Faber
(74) *Attorney, Agent, or Firm* — METIS IP LLC

(57) ABSTRACT

Disclosed is a method for managing exhaust emission in a smart city based on Internet of Things. The method is executed by a management platform of an Internet of Things system, the system further includes a user platform, a service platform, a management platform, a sensor network platform, and one or more object platforms. The method includes: obtaining current monitoring data in a preset area collected by an object platform of the one or more object platforms through the sensor network platform, determining vehicle information based on the current monitoring data, determining a total amount of exhaust emission in the preset area based on the vehicle information, and determining vehicle limit information based on the total amount of exhaust emission, and sending the vehicle limit information to the user platform through the service platform by the management platform.

14 Claims, 6 Drawing Sheets

(51) Int. Cl.
*G06V 10/62* (2022.01)
*G08G 1/01* (2006.01)
*G16Y 10/40* (2020.01)
*G16Y 20/10* (2020.01)

(56) References Cited

U.S. PATENT DOCUMENTS

| | | | |
|---|---|---|---|
| 10,760,512 B2* | 9/2020 | De Smet | F02D 41/0235 |
| 11,360,236 B1* | 6/2022 | Khedekar | G06V 20/17 |
| 2015/0006018 A1* | 1/2015 | Tesanovic | G07C 5/0808 |
| | | | 701/29.6 |
| 2017/0091350 A1* | 3/2017 | Bauer | G06F 30/15 |
| 2017/0124461 A1* | 5/2017 | Li | G01W 1/00 |
| 2017/0285181 A1* | 10/2017 | Zheng | G08G 1/065 |
| 2018/0003116 A1* | 1/2018 | Fersman | F01N 13/08 |
| 2018/0054490 A1* | 2/2018 | Wadhwa | G08G 1/0129 |
| 2019/0113445 A1* | 4/2019 | Zhang | G01W 1/02 |
| 2019/0273783 A1* | 9/2019 | Shao | G06Q 50/26 |
| 2019/0279069 A1* | 9/2019 | Bastide | G16H 20/10 |
| 2020/0333152 A1* | 10/2020 | Markert | B60W 50/0098 |
| 2020/0362784 A1* | 11/2020 | De Smet | F02D 41/0235 |
| 2021/0042648 A1* | 2/2021 | Wang | G16Z 99/00 |
| 2021/0108937 A1 | 4/2021 | Fox et al. | |
| 2021/0131964 A1* | 5/2021 | Hao | G08G 1/04 |
| 2021/0199538 A1* | 7/2021 | Kihara | G08G 1/0969 |
| 2022/0057373 A1* | 2/2022 | Hao | G08G 1/0112 |
| 2022/0092418 A1* | 3/2022 | Liu | G06N 3/045 |
| 2022/0402477 A1* | 12/2022 | Huh | B60W 10/26 |
| 2023/0011007 A1* | 1/2023 | Nagata | G06Q 50/40 |
| 2023/0063836 A1* | 3/2023 | Shao | G06Q 50/26 |
| 2023/0280173 A1* | 9/2023 | Aljar | G08G 1/0129 |
| | | | 701/123 |
| 2023/0351408 A1* | 11/2023 | Kim | G06Q 20/1235 |
| 2024/0053767 A1* | 2/2024 | Xing | B60W 30/16 |

FOREIGN PATENT DOCUMENTS

| | | | | |
|---|---|---|---|---|
| CN | 106845371 B | | 10/2019 | |
| CN | 110349427 A | | 10/2019 | |
| CN | 106650825 B | | 5/2020 | |
| CN | 111524344 A | | 8/2020 | |
| CN | 111985567 A | * | 11/2020 | G01D 21/02 |
| CN | 114509539 A | * | 5/2022 | |
| CN | 111461410 B | * | 8/2022 | G06N 3/0454 |
| CN | 110909483 B | * | 9/2023 | G06F 16/29 |
| KR | 102463985 B1 | * | 11/2022 | |
| TW | 1766726 B | | 6/2022 | |
| WO | WO-2020120789 A1 | * | 6/2020 | G08G 1/0112 |

OTHER PUBLICATIONS

Francis et al, "IoT Based Vehicle Emission Monitoring System", IJITEE, 2019, 4 pages.*
Nayak, Jagadish "Round the Clock Vehicle Emission Monitoring using IoT for Smart Cities", IJACSA, 2018, 4 pages.*
Jacyna et al., "Scenario Analyses of Exhaust Emissions Reduction through the Introduction of Electric Vehicles into the City", energies, Apr. 6, 2021, 34 pages.*
Devin et al., "IoT Based Vehicle Emission Monitoring and Alerting System", IEEE Scored, Oct. 2019, 5 pages.*
Gühnemann et al., "Monitoring Traffic and Emissions by Floating Car Data", Institute of Transport Studies, Mar. 2004, 10 pages.*
Ghoneim et al, "Towards a Smart Sustainable City: Air Pollution Detection and Control using Internet of Things", IEEE, 2019, 6 pages.*
Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.

* cited by examiner

METHODS AND SYSTEMS FOR MANAGING EXHAUST EMISSION IN A SMART CITY BASED ON INDUSTRIAL INTERNET OF THINGS

CROSS-REFERENCE TO RELATED DISCLOSURES

This application claims priority to Chinese Patent Application No. 202210740751.1, filed on Jun. 28, 2022, the entire contents of which are hereby incorporated by reference.

TECHNICAL FIELD

The present disclosure relates to the field of Internet of Things and cloud platforms, and in particular to a method and a system for managing exhaust emission in a smart city based on Internet of Things.

BACKGROUND

With the continuous development of social economy, the number of private cars is increasing day by day, and the total amount of vehicle exhaust emission is also increasing. In turn, traffic congestion is aggravated, and the increase in vehicle energy consumption and exhaust emission brought about by the congestion also deteriorates the urban environment to a certain extent. Therefore, how to improve traffic congestion and reduce the impact of vehicle exhaust on the urban environment has become an urgent problem to be solved.

Therefore, it is hoped to provide a method and a system for managing exhaust emission in a smart city based on Internet of Things.

SUMMARY

One or more embodiments of the present disclosure provide a method for managing exhaust emission in a smart city based on Internet of Things. The method may be implemented based on a system for managing exhaust emission in a smart city based on Internet of Things, and the system may include: a user platform, a service platform, a management platform, a sensor network platform and one or more object platforms, the method may be executed by the management platform: current monitoring data in a preset area collected by the one or more object platforms may be obtained through the sensor network platform, wherein, the sensor network platform may include one main platform of the sensor network platform and at least one sub-platform of the sensor network platform, the at least one sub-platform of the sensor network platform may be in one-to-one correspondence with different object platforms, store and process the current monitoring data collected by the object platforms, and transmit processed information to the main platform of the sensor network platform, the main platform of the sensor network platform may transmit the processed information to the management platform, different sub-platforms of the sensor network platform corresponding to different regional locations within the preset area, vehicle information may be determined based on the current monitoring data, wherein the vehicle information includes at least one of basic vehicle information, vehicle flow information, vehicle speed information, and vehicle type distribution information; a total amount of exhaust emission in the preset area may be determined based on the vehicle information; and determining vehicle limit information based on the total amount of exhaust emission, and the vehicle limit information may be sent to the user platform through the service platform by the management platform.

One or more embodiments of the present disclosure provide a system for managing exhaust emission in a smart city based on Internet of Things, and the system includes a user platform, a service platform, a management platform, a sensor network platform and one or more object platforms, and the management platform is configured to execute the following operations: current monitoring data in a preset area collected by the one or more object platforms may be obtained through the sensor network platform, wherein, the sensor network platform may include one main platform of the sensor network platform and at least one sub-platform of the sensor network platform, the at least one sub-platform of the sensor network platform may be in one-to-one correspondence with different object platforms, store and process the current monitoring data collected by the object platform, and transmit processed information to the main platform of the sensor network platform, the main platform of the sensor network platform may transmit the processed information to the management platform, different sub-platforms of the sensor network platform corresponding to different regional locations within the preset area, vehicle information may be determined based on the current monitoring data, wherein the vehicle information includes at least one of basic vehicle information, vehicle flow information, vehicle speed information, and vehicle type distribution information; a total amount of exhaust emission in the preset area may be determined based on the vehicle information; and vehicle limit information may be determined based on the total amount of exhaust emission, and the vehicle limit information may be sent to the user platform through the service platform by the management platform.

One or more embodiments of the present disclosure provide a device of exhaust emission in a smart city based on the Internet of Things, wherein the device includes at least one processor and at least one memory, the at least one memory is used to store computer instructions, the at least one processor is configured to execute at least part of the computer instructions to implement the method for managing exhaust emission in a smart city based on Internet of Things.

One or more embodiments of the present disclosure provide a non-transitory computer-readable storage medium storing a set of instructions, when executed by at least one processor, causing the at least one processor to perform the method for managing exhaust emission in a smart city based on Internet of Things.

BRIEF DESCRIPTION OF THE DRAWINGS

The present disclosure will be further described by way of exemplary embodiments, which will be described in detail by means of the accompanying drawings. These examples are not limiting, and in these examples, the same numbers refer to the same structures, wherein.

DETAILED DESCRIPTION

Figure 1:
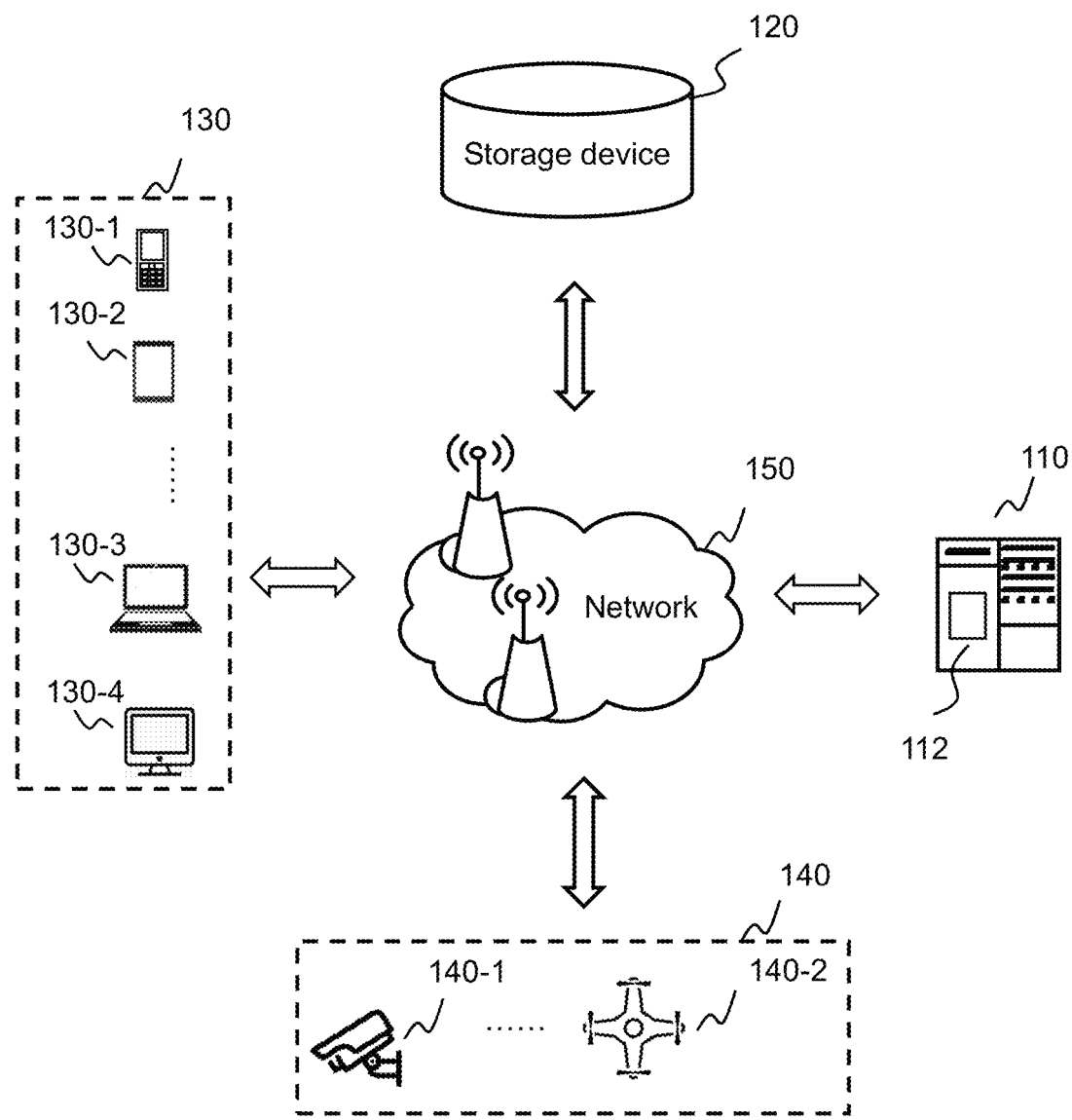
FIG. 1 illustrates a schematic diagram of an application scenario of a system for managing exhaust emission in a smart city based on Internet of Things according to some embodiments of the present disclosure.

In order to illustrate technical solutions of the embodiments of the present disclosure more clearly, the following briefly illustrates drawings in the illustration of the embodiments. Drawings in the following illustration are merely some examples or embodiments of the present disclosure. For those skilled in the art, the present disclosure may be applied to other similar scenarios in accordance with the drawings without creative works. Unless obviously obtained from the context or the context illustrates otherwise, the same number in the drawings refers to the same structure or operation.

It should be understood that "system", "apparatus", "unit", and/or "module" used herein are a method for distinguishing different components, elements, members, parts, or assemblies of different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "comprising" and "including" only prompt steps and elements that are explicitly identified, and these steps and elements do not constitute an exclusive list. Methods or apparatus may also include other steps or elements.

Flowcharts are used in the present disclosure to illustrate the operations performed by the system according to some embodiments of the present disclosure. It should be understood that the front or rear operations may not be necessarily performed exactly in order. On the contrary, each step may be performed in reverse or simultaneously. At the same time, other operations may also be added to the procedures, or a certain step or several steps may be removed from the procedures.

FIG. 1 illustrates a schematic diagram of an application scenario of a system for managing exhaust emission in a smart city based on Internet of Things according to some embodiments of the present disclosure. In some embodiments, the application scenario 100 may include a server 110, a storage device 120, a user terminal 130, a collection device 140, and a network 150.

In some embodiments, the server 110 may be a single server or a set of servers. The set of servers may be centralized or distributed. In some embodiments, the server 110 may be implemented on a cloud platform. In some embodiments, the server 110 may include a processing device 112. The processing device 112 may be used to obtain and analyze the collected information to perform one or more of the functions described in the application. For example, the processing device 112 may acquire set of servers obtain the traffic data monitored by the collection device 140, determine vehicle information, and then determine the corresponding total amount of exhaust emission, generate corresponding vehicle limit information and provide the vehicle limit information to the user terminal 130.

The storage device 120 may be used to store data and/or instructions, for example, the storage device 120 may be used to store traffic data monitored by the collection device 140. The storage device 120 may obtain data and/or instructions from, for example, the server 110, the user terminal 130, or the like. In some embodiments, the storage device 120 may store data and/or instructions that processing device 112 executes or uses to accomplish the example methods described in the present disclosure.

The user terminal 130 may refer to a terminal used by a user to input and query information such as traffic information. The user terminal 130 may also refer to a terminal used by the user to receive information such as vehicle limit information. For example, the user terminal 130 may include, but is not limited to, at least one of a smart phone 130-1, a tablet computer 130-2, a laptop computer 130-3, a processor 130-4, and other devices with input and/or output functions or any combination thereof. In some embodiments, the user terminal 130 may be associated with the server 110. In some embodiments, the user terminal 130 may be one or more users, which may include users who directly use the service, or may include other related users.

The collection device 140 may refer to a device for obtaining traffic data information. For example, the collection device 140 may include, but is not limited to, a road monitoring device 140-1 and a drone photographing device 140-2. In some embodiments, the road monitoring device 140-1 may be an infrared camera, a high-definition digital camera. In some embodiments, the drone photographing device 140-2 may be an unmanned aerial vehicle operated by a radio remote control device. In some embodiments, the collection device 140 may be configured to one or more object sub-platforms of the Internet of Things. The road monitoring device 140-1 may be a sub-platform of road monitoring device, and the drone photographing device 140-2 may be a sub-platform of drone photographing device.

The network 150 may provide a channel for the exchange of information and/or data. In some embodiments, the server 110, the storage device 120, the user terminal 130, and the collection device 140 may exchange information through the network 150. For example, the server 110 may obtain the traffic monitoring data uploaded by the collection device 140 through the network 150 and store the traffic monitoring data in the storage device 120.

It should be noted that the application scenario 100 is provided for illustrative purposes only, and is not intended to limit the scope of the application. For those skilled in the art, various modifications or changes may be made based on the description of the present disclosure. For example, application scenario 100 may be implemented on other devices to achieve similar or different functionality. However, such modifications and changes do not depart from the scope of the application.

The Internet of Things system is a kind of information processing system including some or all of platforms in a user platform, a service platform, a management platform, a sensor network platform, and an object platform, wherein, the user platform is the leader of the entire Internet of Things operating system, and may be used to obtain user requirements. The user requirements are the basis and premise of the formation of the Internet of Things operating system, and the connection between the various platforms of the Internet of Things system is to meet the requirements of users. The service platform is a bridge between the user platform and the management platform to realize the connection between the user platform and the management platform. The service platform may provide users with input and output services. The management platform may realize the overall planning and coordination of the connection and cooperation between various functional platforms (such as the user platform, the service platform, the sensor network platform, and the object platform). The management platform may gather the information of the Internet of Things operation system and provide perception management and control management functions for the Internet of Things operation system. The sensor network platform may realize the connection the management platform and the object platform, and play the functions of perception information sensing communication and control information sensing communication. The object platform is a functional platform for the generation of perception information and the execution of control information.

The processing of information in the Internet of Things system may be divided into a processing flow of perception information and a processing flow of control information, and the control information may be information generated based on the perception information. Among them, the processing of perception information is that the object platform obtains the perception information, and transmits the perception information to the management platform through the sensor network platform. The management platform may transmit the calculated perception information to the service platform, and finally transmits it to the user platform. The user generates control information after judging and analyzing the perception information. The control information may be generated by the user platform and sent to the service platform, and the service platform then transmits the control information to the management platform. The management platform may calculate and process the control information, and send the control information to the object platform through the sensor network platform, so as to realize the control of the corresponding object.

In some embodiments, when the Internet of Things system is applied to city management, it may be referred to as Internet of Things system in a smart city.

Figure 2:
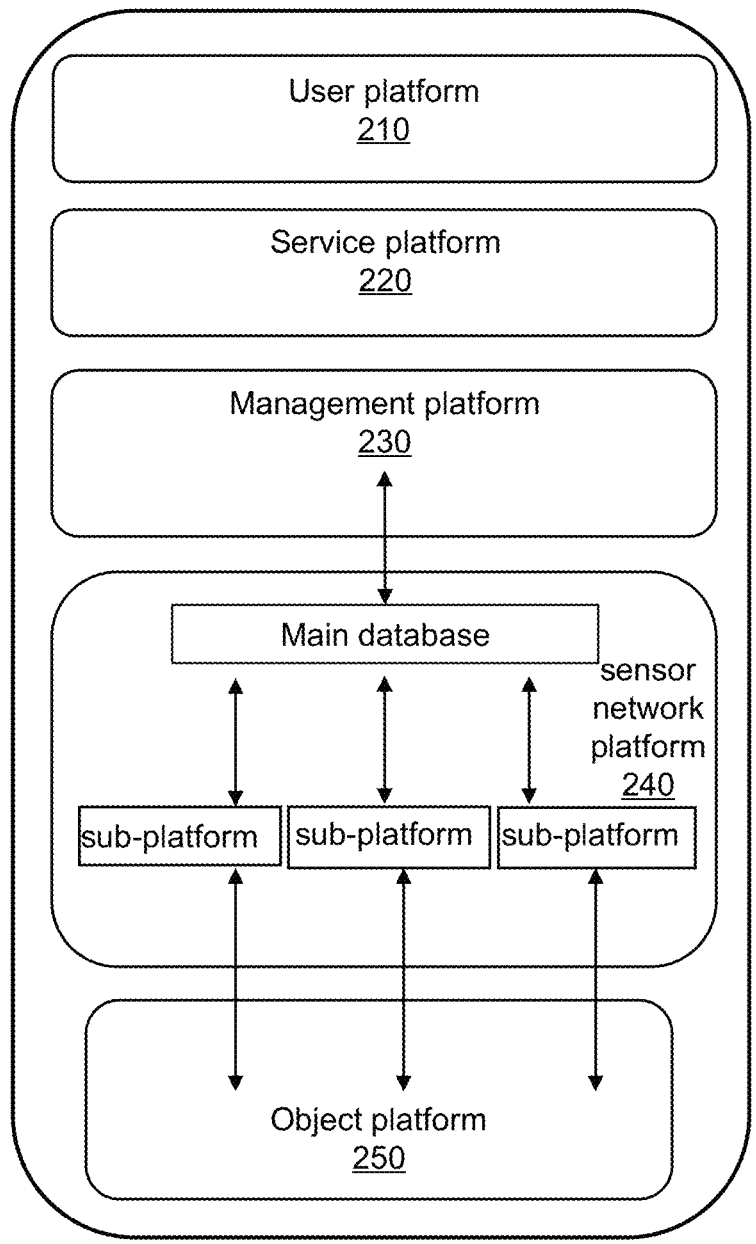
FIG. 2 illustrates an exemplary structural diagram of a system for managing exhaust emission in a smart city based on Internet of Things according to some embodiments of the present disclosure.

FIG. 2 illustrates an exemplary structural diagram of a system for managing exhaust emission in a smart city based on Internet of Things according to some embodiments of the present disclosure. As shown in FIG. 2, the system 200 for managing exhaust emission in a smart city based on Internet of Things includes a user platform 210, a service platform 220, a management platform 230, a sensor network platform 240 and one or more object platforms 250. In some embodiments, the system 200 for managing exhaust emission in a smart city based on Internet of Things may be part of or implemented by the server 110.

The user platform 210 may be a user-facing service interface. In some embodiments, the user platform 210 may receive user-initiated query requirements for traffic information. In some embodiments, the user platform 210 may be configured to feed back vehicle limit information to the user. In some embodiments, the user platform 210 may send the query requirements to the service platform. In some embodiments, the user platform 210 may receive such as vehicle limit information sent by the service platform.

The service platform 220 may be a platform that performs preliminary processing on query requirements. In some embodiments, the service platform 220 may communicate the query requirements to the management platform. In some embodiments, the service platform 220 may receive such as vehicle limit information sent by the management platform.

The management platform 230 may refer to overall planning, coordination of the connection and cooperation between the functional platforms, and Internet of Things platform that provides perception management and control management.

In some embodiments, the management platform 230 may also determine vehicle information based on the current monitoring data in the preset area collected by the object platform uploaded by the sensor network platform, wherein the vehicle information may include at least one of basic vehicle information, vehicle flow information, vehicle speed information and vehicle type distribution information. In some embodiments, the management platform 230 may further determine the total amount of exhaust emission in the preset area based on the vehicle information, and then determine the vehicle limit information based on the total amount of exhaust emission. In some embodiments, the management platform 230 may send the vehicle limit information to the user platform through the service platform.

In some embodiments, the management platform 230 may generate query instructions. In some embodiments, the management platform 230 may issue the query instructions to the main platform of the sensor network platform. In some embodiments, the management platform 230 may receive the query requirement sent by the service platform.

The sensor network platform 240 may be a platform that realizes the interaction between the management platform and the object platform. In some embodiments, the sensor network platform 240 may receive the query instructions sent by the management platform. In some embodiments, the sensor network platform 240 may send the query instructions to the corresponding object platform. In some embodiments, the sensor network platform 240 may employ a front split arrangement. The front split arrangement may include one main platform of the sensor network platform and a plurality of sub-platforms of the sensor network platform, and the plurality of sub-platforms of the sensor network platform may store and process different data sent by the object platform(s) 250 respectively, and transmit the processed information to the main platform of the sensor network platform, the main platform of the sensor network platform may aggregate and store and process the data of the plurality of sub-platforms of the sensor network platform, and transmit the data to the management platform. As shown in FIG. 2, the sub-platforms of the sensor network platform 240 may obtain data from the object platform(s) 250, the sub-platforms of the sensor network platform may aggregate the data to the main database of the sensor network platform 240, and the main database of the sensor network platform 240 may be uploaded data to management platform.

The object platform(s) 250 may be a functional platform for the generation of perception information and the final execution of control information. The object platform(s) 250 may be used to obtain current monitoring data in a preset area according to the query instruction. In some embodiments, the object platform(s) 250 may further upload the current monitoring data in the preset area to the management platform through the corresponding sub-platforms of the sensor network platform and the main platform of the sensor network platform.

The vehicle current limiting system of the exhaust emission situation in a smart city is implemented through the Internet of Things functional architecture of five platforms, which improves the traffic congestion and reduces the impact on the urban environment at the same time.

For those skilled in the art, after understanding the principle of the system, it is possible to move the system 200 for managing exhaust emission in a smart city based on the Internet of Things to any other suitable scenario.

It should be noted that the above description of the system and its components is only for the convenience of description, and cannot limit the present disclosure to the scope of the illustrated embodiments. It may be understood that for those skilled in the art, after understanding the principle of the system, it is possible to arbitrarily combine the various components, or form a subsystem to connect with other components without departing from the principle. For example, each component may share one storage device, and each component may also have its own storage device. Such deformations are within the scope of protection of the present disclosure.

Figure 3:
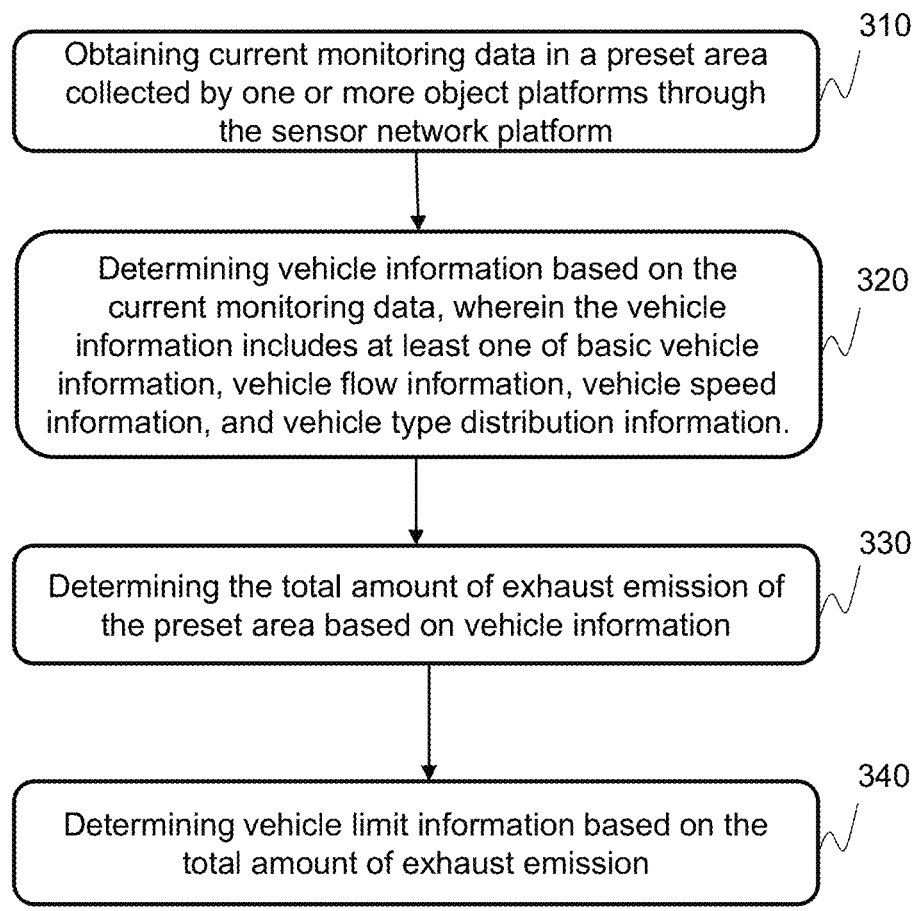
FIG. 3 illustrates an exemplary flowchart of a method for managing exhaust emission in a smart city based on Internet of Things according to some embodiments of the present disclosure.

FIG. 3 illustrates an exemplary flowchart of a method for managing exhaust emission in a smart city based on Internet of Things according to some embodiments of the present disclosure. In some embodiments, the process 300 may be implemented based on the Internet of Things system for managing exhaust emission. The Internet of Things system for managing exhaust emission may include a user platform, a service platform, a management platform, a sensor network platform and one or more object platforms. The method may be performed by the management platform 230. As shown in FIG. 3, the process 300 may include the following operations.

In operation 310, current monitoring data in a preset area collected by the one or more object platforms 250 may be obtained through the sensor network platform 240. In some embodiments, the current monitoring data may be a time-based image sequence output by the road monitoring system. The road monitoring system may refer to a monitoring system including at least one collection device (e.g., a camera) to collect current monitoring data in a preset area.

The preset area may refer to a preset monitoring area. The current monitoring data may refer to current monitoring data related to the vehicle.

The sensor network platform 240 may use different sub-platforms of the sensor network for data storage, data processing and/or data transmission for the data of different object platforms 250. Different sub-platforms of the sensor network platform corresponding to different regional positions in the preset area.

In some embodiments, the management platform 230 may obtain current monitoring data in the road monitoring system in the area where the object platform(s) 250 are located through the sensor network platform 240.

In operation 320, vehicle information may be determined based on the current monitoring data, wherein the vehicle information includes at least one of basic vehicle information, vehicle flow information, vehicle speed information, and vehicle type distribution information.

The vehicle information may refer to information related to determining the total amount of exhaust emission in a preset area.

The basic vehicle information may refer to information related to the vehicle type, category, power type, exhaust volume and/or license plate number of a vehicle. For example, the basic vehicle information including the vehicle type, category, and power type may be medium fuel off-road vehicles, small electric vehicles, etc.

The vehicle flow information may refer to the count of vehicles passing through a unit time in the preset area. The vehicle speed information may refer to the vehicle speed information of each vehicle in the preset area. The vehicle type distribution information may refer to the distribution of a count of different vehicle types in the preset area, for example, distribution of a count of the fuel vehicles in small, miniature, compact, medium and high-end types in a preset area.

In some embodiments, when the preset area includes a plurality of road segments, and each road segment of the plurality of road segments includes at least one monitoring point, the management platform 230 may obtain the current monitoring data corresponding to a monitoring point in a road segment in a preset area collected by the object platform through the sensor network platform. The vehicle information of the monitoring point may be determined, by the management platform, through processing the current monitoring data through the data acquisition model. In some embodiments, the data acquisition model may be a machine learning model. For more details on the method of determining vehicle information based on current monitoring data, please refer to FIG. 4 and its related description.

In operation 330, the total amount of exhaust emission of the preset area may be determined based on vehicle information.

The total amount of exhaust emission may refer to the total amount of exhaust emission of vehicles passing each road segment in the preset area.

In some embodiments, the management platform 230 may add up the amount of vehicle exhaust emission of each sampled road segment in the preset area included in the vehicle information, and then average the amount of vehicle exhaust emission of each sampled road segment to obtain the average amount of vehicle exhaust emission, and based on the multiplication of the average amount of vehicle exhaust emission by the total number of road segments in the preset area to obtain the total amount of exhaust emission in the preset area.

In some embodiments, the amount of exhaust emission corresponding to each sampled road segment may be determined, by the management platform 230, through respectively processing the vehicle information of each sampled road segment of the plurality of sampled road segments in the preset area through the second model. The total amount of exhaust emission in the preset area may be determined based on the exhaust emission corresponding to each sampled road segment by the management platform. For more information on the method for determining total amount of the exhaust emission through the second model, please refer to FIG. 6 and its related description below.

In operation 340, vehicle limit information may be determined based on the total amount of exhaust emission.

The vehicle limit information may refer to whether the vehicle is restricted in the preset area and the restricted mode. For example, the vehicle limit information may include that fuel vehicles of medium and high-end types are restricted to pass through a preset area from 7:30-20:00 on weekdays.

In some embodiments, the vehicle limit information may be determined, by the management platform 230, through comparing the total amount of exhaust emission in the preset area with a preset threshold of the total amount of exhaust emission in the preset area. For example, if the total amount of exhaust emission in the preset area exceeds a preset threshold, the vehicles may be restricted to pass through the preset area (e.g., in a preset time period, some vehicle types are prohibited from passing through the preset area). For another example, if the total amount of exhaust emission in the preset area does not exceed the preset threshold, the vehicles in the preset area may be not restricted from running.

In some embodiments, the pollution index information may be determined, by the management platform 230, through processing the total amount of exhaust emission and weather information in the preset area through the first model. The vehicle limit information may be determined based on the pollution index information by the management platform. For more information on the method for determining vehicle limit information based on pollution index information, please refer to FIG. 5 and its related description below.

In some embodiments of the present disclosure, the total amount of vehicle exhaust emission in the preset area may be estimated by the value of vehicle flow reflected by the vehicle information in the preset area, and then the air pollution index of the preset road segment may be determined according to the total amount of exhaust emission, and then whether the vehicles in the preset area are restricted and the mode of restriction may be accurately determined according to the air pollution index, so as to avoid vehicles entering into the preset area and aggravating the air pollution in the preset area.

Figure 4:
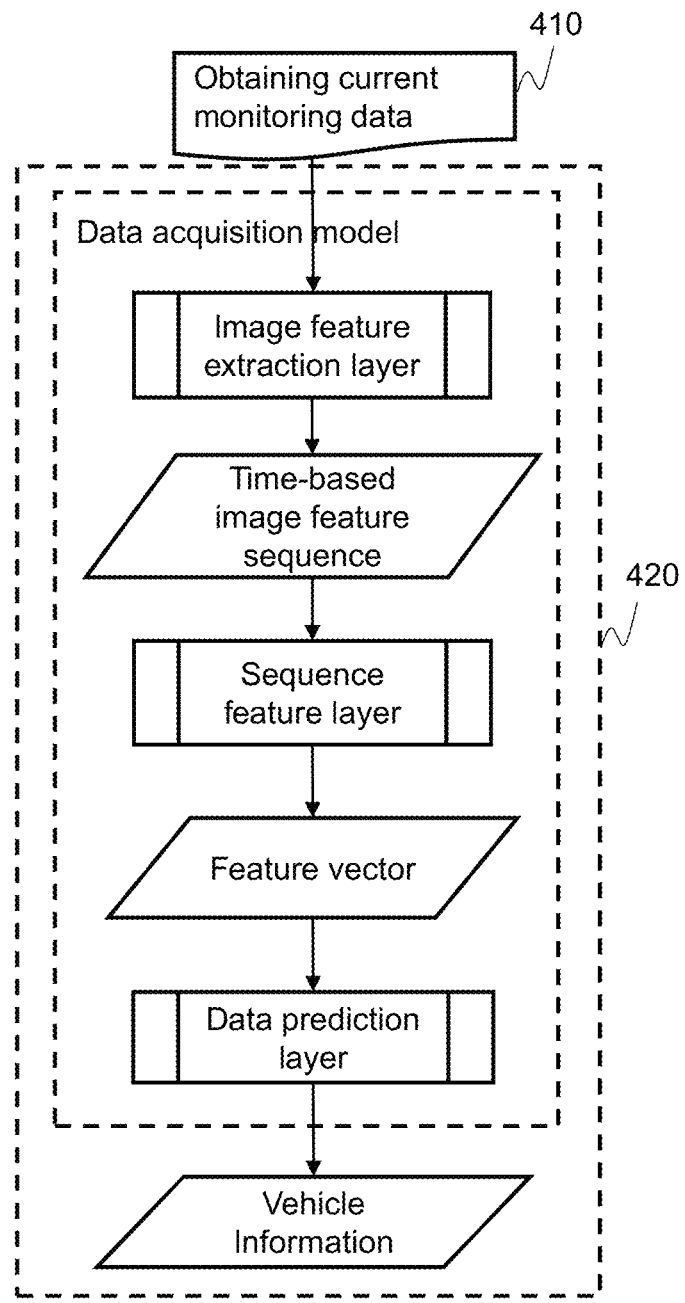
FIG. 4 illustrates an exemplary flowchart of a method for determining vehicle information based on current monitoring data according to some embodiments of the present disclosure.

FIG. 4 illustrates an exemplary flowchart of a method for determining vehicle information based on current monitoring data according to some embodiments of the present disclosure. In some embodiments, the process 400 may be performed by management platform 230. As shown in FIG. 4, the process 400 may include the following operations.

In operation 410, the current monitoring data corresponding to a monitoring point in a road segment in the preset area collected by the object platform may be obtained through the sensor network platform.

In some embodiments, the preset area may include a plurality of road segments, and each road segment of the plurality of road segments may include at least one monitoring point.

The monitoring point may refer to a monitoring location in a preset area for obtaining monitoring data.

In some embodiments, the current monitoring data of a monitoring point in a preset area collected by a collection device (e.g., a camera) of the object platform(s) 250 may be obtained through the sensor network platform 240 by the management platform 230.

In operation 420, the vehicle information of the monitoring point may be determined through processing the current monitoring data by a data acquisition model, wherein the data acquisition model may be a machine learning model.

The data acquisition model may be used to obtain vehicle information at the monitoring point.

In some embodiments, the data acquisition model may include an image feature extraction layer, a sequence feature layer, and a data prediction layer. The image feature extraction layer, the sequence feature layer and the data prediction layer are connected in turn. The management platform 230 may input the current monitoring data corresponding to a monitoring point into the image feature extraction layer, and the image feature extraction layer may output a time-based image feature sequence. Then, the time-based image feature sequence may be input into the sequence feature layer, and the sequence feature layer may output the feature vector. Then the feature vector may be input into the data prediction layer, and the data prediction layer may output the vehicle information. In some embodiments, the image feature extraction layer may be a Convolutional Neural Networks (CNN). The sequence feature layer may be a Recurrent Neural Network (RNN). The data prediction layer may be a Neural Network (NN).

In some embodiments, the vehicle information may include vehicle speed information corresponding to the monitoring point in the future time period. The future time period may refer to the time period after the current time point. In some embodiments, the total amount of exhaust emission in the future time period within the preset area may be predicted based on the vehicle speed information corresponding to the monitoring point in the future time period by the management platform 230.

In some embodiments, the image feature extraction layer, the sequence feature layer and the data prediction layer may be obtained through training. The training process may be performed by the management platform 230, and the training may be implemented based on the following methods.

The training samples and labels of the image feature extraction layer, the sequence feature layer and the data prediction layer are obtained respectively. A training sample of the image feature extraction layer may be historical monitoring data (such as time-based image sequences output by a road monitoring system), and a label of the image feature extraction layer may be a historical time-based image feature sequence. A training sample of the sequence feature layer may be the historical time-based image feature sequence, and a label of the sequence feature layer may be a historical feature vector. A training sample of the data prediction layer may be the historical feature vector, and a label of the data prediction layer may be historical vehicle information (including historical vehicle flow information, historical vehicle type distribution information, and historical vehicle speed information).

In some embodiments, the labels of the image feature extraction layer, the sequence feature layer and the data prediction layer may be obtained by manual calibration.

The plurality of labeled training samples are respectively input into the corresponding initial image feature extraction layer, initial sequence feature layer and initial data prediction layer. The parameters of the initial image feature extraction layer, the initial sequence feature layer and the initial data prediction layer may be updated through training iterations. When the trained models meet the preset conditions, the training ends, and the trained image feature extraction layer, sequence feature layer and data prediction layer may be obtained. In some embodiments, the preset conditions may be that the loss function is smaller than a threshold, converges, or the training cycle reaches a threshold.

In some embodiments, a trained data acquisition model may be obtained by jointly training the image feature extraction layer, the sequence feature layer and the data prediction layer of the data acquisition model.

In some embodiments, the training samples of the data acquisition model may be historical monitoring data, and the labels of the training samples may be historical vehicle information.

In some embodiments, the historical monitoring data in the training samples may be input into the image feature extraction layer in the data acquisition model, the output of the image feature extraction layer may be input into the sequence feature layer in the data acquisition model, the output of the sequence feature may be input into the prediction layer in the data acquisition model, and a loss function may be built based on the output of the prediction layer and labels of the data acquisition model. And based on the loss function, the parameters of the image feature extraction layer, the sequence feature layer and the data prediction layer may be iteratively updated until the preset conditions are satisfied and the training is completed, and the trained data acquisition model is obtained. In some embodiments, the preset conditions may be that the loss function is smaller than a threshold, converges, or the training cycle reaches a threshold.

In some embodiments of the present disclosure, the parameters of the data acquisition model may be obtained by the above-mentioned training method, and it is beneficial to solve the problem that, in some cases, it is difficult to obtain labels of the image feature extraction layer and the sequence feature layer when training the image feature extraction layer and the sequence feature layer separately, and to enable the data acquisition model to obtain vehicle information more accurately and quickly.

In some embodiments, when a road segment includes a plurality of monitoring points, vehicle information of the entire road segment may be determined by fusing vehicle information obtained at each monitoring point.

In some embodiments, the vehicle information obtained at each monitoring point may be averaged or weighted averaged to determine the vehicle information of the entire road segment. In some embodiments, the weight of each monitoring point may be determined based on whether there is an intersection between the points. For example, if there are an intersection between two adjacent monitoring points, the weights of the monitoring points are relatively high.

In some embodiments of the present disclosure, the vehicle information of the entire preset area may be determined by fusing the vehicle information obtained at the plurality of monitoring points in the preset area, which can avoid that the vehicle information obtained from a single monitoring point is incomplete and cannot objectively reflect the vehicle information of the entire preset area, which may lead to the inaccuracy of the total amount of exhaust emission in the preset area obtained based on the vehicle information.

It should be noted that the above description about the process 400 is only for example and illustration, and does not limit the scope of application of the present disclosure. For those skilled in the art, various modifications and changes may be made to the process 400 under the guidance of the present disclosure. However, these modifications and changes are still within the scope of the present disclosure.

Figure 5:
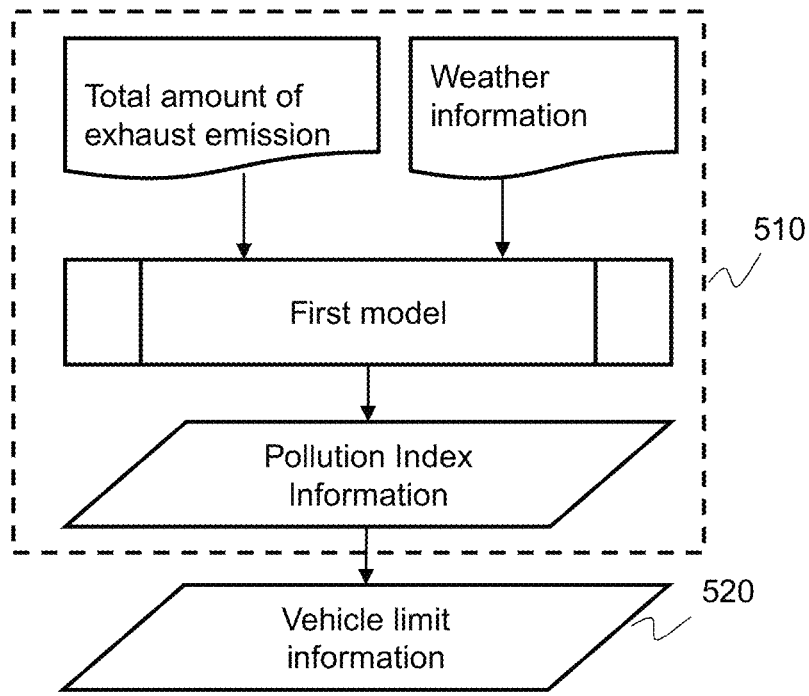
FIG. 5 illustrates an exemplary flowchart of a method for determining vehicle limit information based on a total amount of exhaust emission according to some embodiments of the present disclosure.

FIG. 5 illustrates an exemplary flowchart of a method for determining vehicle limit information based on a total amount of exhaust emission according to some embodiments of the present disclosure. The method may be performed by the management platform 230. As shown in FIG. 5, the process 500 may include the following operations.

In operation 510, the pollution index information may be determined through processing the total amount of exhaust emission and weather information in the preset area by a first model.

The weather information may refer to various meteorological changes that occur in the atmosphere within a preset time within a preset area, such as conditions temperature, humidity, air pressure, precipitation, wind, and clouds, etc. The pollution index information may refer to an air pollution index in a preset area.

The pollution index information may be predicted by the first model. In some embodiments, the first model may be a machine learning model. The total amount of exhaust emission and weather information in the preset area may be input into the first model, and the first model may output pollution index information.

In some embodiments, the input of the first model may also include historical pollution index information within a preset area.

In some embodiments, the first model may be a CNN.

In some embodiments, the first model may be obtained through training. The training process may be performed by the management platform 230, and the training may be implemented based on the following methods.

The training samples and labels of the first model may be obtained. The training samples of the first model may be the historical total amount of exhaust emission and historical weather information in the preset area, and the labels of the first model may be the air pollution index of the subsequent preset time period. In some embodiments, the labels of the first model may be obtained from a third-party air pollution index testing agency.

A plurality of labeled training samples may be input into the first model. The parameters of the initial first model may be updated through training iterations. When the trained model meets the preset condition, the training ends, and the trained first model is obtained. In some embodiments, the preset condition may be that the loss function is smaller than a threshold, converges, or the training cycle reaches a threshold.

In operation 520, the vehicle limit information may be determined based on the pollution index information by the management platform.

In some embodiments, the vehicle limit information may be determined based on whether the air pollution index is greater than a preset threshold of the air pollution index by the management platform 230. The preset threshold of the air pollution index may be obtained by those skilled in the art based on experience. For example, if the air pollution index is greater than the preset threshold, the management platform 230 may release the vehicle limit information in the preset area. For another example, if the air pollution index is less than or equal to the preset threshold, the management platform 230 does not need to release the vehicle limit information in the preset area.

In some embodiments, whether an air pollution index in the pollution index information is in a boundary interval of a preset threshold of the air pollution index may be determined by the management platform 230, in response to a determination that the air pollution index is in the boundary interval, the pollution index information may be re-determined, and the vehicle limit information may be determined based on the re-determined pollution index information.

The boundary interval may refer to a preset interval that is close to a boundary of the preset threshold of the air pollution index. For example, if the preset threshold of the air pollution index is in the range of 180-200, the boundary interval may be in the range of 180-181 or in the range of 198-200.

In some embodiments, the pollution index information may be determined through processing the determined initial total amount of exhaust emission and the weather information in the preset area through the first model, and whether the pollution index information may be determined is in the boundary interval based on comparing the pollution index information with the boundary interval by the management platform 230.

In some embodiments, the vehicle information of each road segment in the preset area may be processed by the second model, the amount of exhaust emission in each road segment may be determined, and then the total amount of exhaust emission in the preset area may be determined, and the pollution index may be re-determined according to the total amount of exhaust emissions, and then the vehicle limit information may be determined. For a related description of how to determine the total amount of exhaust emission in the preset area through the second model, please refer to FIG. 6 and related descriptions.

In some embodiments of the present disclosure, since weather information may have influence on the dilution, mitigation and diffusion of air pollution, the pollution index information may be determined through inputting the total amount of exhaust emission and weather information of the present area into the first model, the influence of the weather information on the pollution index information may be additionally considered, thereby improving the accuracy of determining the pollution index information by the first model In addition, for the situation that the pollution index determined by the first model is in the boundary interval, when the vehicle limit information cannot be accurately determined, the amount of exhaust emission of each road segment may be predicted through using the more refined second model, and then the total amount of exhaust emission in the preset area is determined. Then, the pollution index may be re-determined according to the total amount of exhaust emission, and the real value of the pollution index in the boundary area is further obtained, which improves the accuracy of the vehicle limit information.

Figure 6:
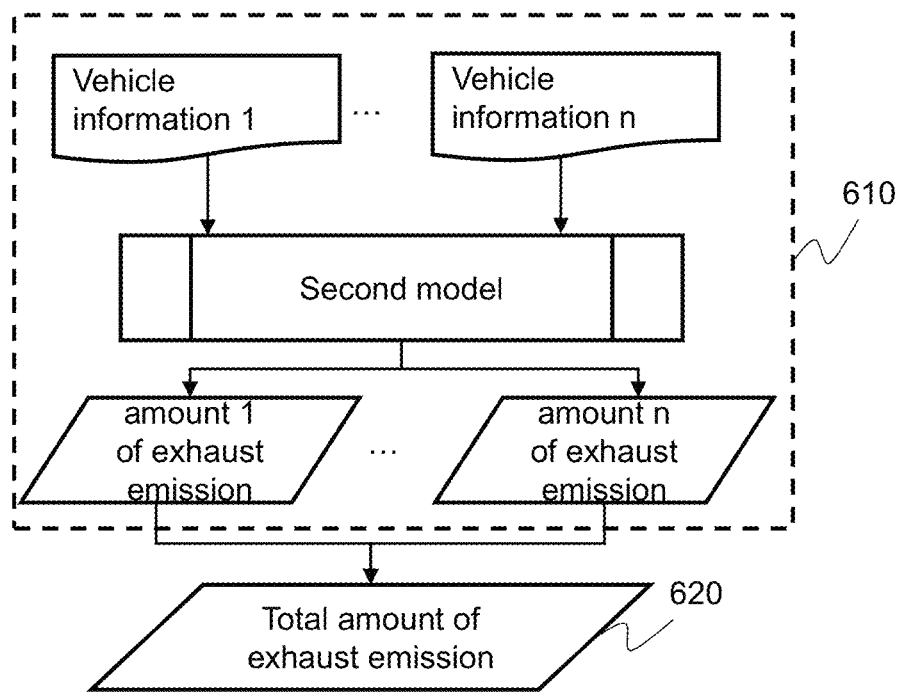
FIG. 6 illustrates an exemplary flowchart of a method for determining the total amount of exhaust emission in a preset area based on vehicle information according to some embodiments of the present disclosure.

FIG. 6 illustrates an exemplary flowchart of a method for determining the total amount of exhaust emission in a preset area based on vehicle information according to some embodiments of the present disclosure. The method may be performed by the management platform 230. As shown in FIG. 6, the process 600 may include the following operations.

In operation 610, through processing the vehicle information of each sampled road segment of a plurality of sampled road segments in the preset area by a second model, an amount of exhaust emission corresponding to each sampled road segment may be determined.

In some embodiments, the second model may be a machine learning model, such as CNN, RNN, or the like. The input of the second model may be vehicle information of each sampled road segment of the plurality of sampled road segments in the preset area. For example, the input of the second model may be vehicle information 1, vehicle information 2 . . . vehicle information n of the plurality of sampled road segments in the preset area, respectively. The output of the second model may be the amount of exhaust emission corresponding to each sampled road segment. For example, the output of the second model may be the amount 1 of exhaust emission, the amount 2 of exhaust emission, and amount n of exhaust emission corresponding to the sampled road segments, respectively.

In some embodiments, the second model may be obtained through training. The training process may be performed by the management platform 230, and the training may be implemented based on the following methods.

The training samples and labels of the second model may be obtained. The training samples of the second model may be the historical vehicle information of each sampled road segment of the plurality of sampled road segments in the preset area, and the labels of the second model may be the historical amount of exhaust emission corresponding to each sampled road segment.

In some embodiments, the labels of the second model may be obtained through a storage device. The storage device stores historical amount of exhaust emission corresponding to the historical vehicle information of each sampled road segment of the plurality of sampled road segments in the preset area.

A plurality of labeled training samples may be respectively input into the corresponding initial second model. The parameters of the initial second model may be updated through training iterations. When the trained model meets the preset conditions, the training ends, and the trained second model is obtained. In some embodiments, the preset conditions may be that the loss function is smaller than a threshold, converges, or the training cycle reaches a threshold.

In operation 620, the total amount of exhaust emission in the preset area may be determined based on the amount of exhaust emission corresponding to each sampled road segment.

In some embodiments, the total amount of exhaust emission in the preset area may be determined based on the vehicle information in various ways by the management platform 230.

In some embodiments, the amount of exhaust emission of other road segments in the preset area may be determined based on the road segment similarities between each sampled road segment in the preset area and other road segments in the preset area by the management platform 230. Further, the total amount of exhaust emission in the entire preset area may be determined through fusing the amount of exhaust emission of all road segments in the preset area (including a plurality of sampled road segments in the preset area and other road segments in the preset area) by the management platform 230.

In some embodiments, a feature vector corresponding each road segment may be constructed based on the road segment feature information of each road segment in the preset area (a plurality of sampled road segments in the preset area and each road segment in other road segments in the preset area) by the management platform 230. The road segment feature information may include location data, a length of each road segment, one-way or two-way road segment, a surrounding environment of each road segment. Then, the road segment similarities between each sampled road segment in the preset area and other road segments in the preset area may be calculated according to the feature vector corresponding to each road segment.

The location data may refer to data that may reflect the location of the road segment, such as the latitude and longitude data of the road segment. The surrounding environment of each road segment may refer to whether there are schools, hospitals, etc., around the road segment.

The feature vector may refer to a vector constructed based on the road segment feature information of each road segment, for example, a feature vector p constructed based on the segment feature (x, y, m, n) of the corresponding road segment, wherein the segment feature (x, y, m, n) may indicate that the location data of the corresponding road segment is x, the length of each road segment is y, the one-way or two-way road segment is m, and the surrounding environment of each road segment is n, n represents whether there is information such as schools or hospitals around the road segment.

In some embodiments, through separately calculating the distances between the feature vector of each sampled road segment in the preset area and the feature vectors of other road segments in the preset area, and then according to the distances, the road segment similarities between each sampled road segment and other road segments in the preset area may be determined by the management platform 230. For example, if the distance between the feature vector p of the sampled road segment a in the preset area and the feature vector k of another road segment b in the preset area is between 1 and 2, then the similarity between the sampled road segment a in the preset area and the other road segment b is 0.8.

In some embodiments, the amount of exhaust emission of other road segments in the preset area may be obtained through multiplying the road segment similarities between the sampled road segments in the preset area and other road segments by the amount of exhaust emission of the sampled road segment by the management platform 230. For example, if the road segment similarity between the sampled road segment a in the preset area and the other road segment b is 0.8, and the amount of exhaust emission of the sampled road segment a in the preset area is 100 g/km, then the amount of exhaust emission of the other road segment b is 100 g/km×0.8=80 g/km.

In some embodiments, the total amount of exhaust emission of the preset area may be determined through calculating the weighted average amount of the exhaust emission of each road segment in the preset area by the management platform 230. For example, if the amount of exhaust emission of n road segments in the preset area are a1, a2 . . . an, respectively, the average amount of exhaust emission of each road segment is A, and the weight coefficient of the average amount of exhaust emission of each road segment is x, then the total amount of exhaust emission of the present road segment is $C=A*x$, wherein $A=(a1+a2+ \ldots +an)/n$, and x may be determined based on factors such as the count of road segments in the preset area and time.

In some embodiments, the total amount of exhaust emission may also be determined, by the management platform 230, through processing the amount of exhaust emission of the sampled road segments and the road segment similarities between the sampled road segments in the preset area and other road segments in the preset area by using a fusion model.

In some embodiments, the fusion model may be a machine learning model, such as a NN. The input of the fusion model may be the amount of exhaust emission of the sampled road segments and the similarities between the sampled road segments in the preset area and other road segments in the preset area, and the output of the fusion model may be the total amount of exhaust emission in the preset area.

In some embodiments, the fusion model may share the parameters of the fusion layers in the third model. For the definition of the fusion layer of the third model and its training process, please refer to the corresponding description below.

In some embodiments of the present disclosure, the amount of exhaust emission of other road segments is determined by the similarities between the sampled road segments and other road segments, and then the total amount of exhaust emission of the entire preset area is determined, so that it is only necessary to calculate the amount of exhaust emission of the few road segments in the preset area, and then the total amount of exhaust emission of the entire preset area can be predicted, and the prediction efficiency can be improved.

In some embodiments, the current monitoring data, vehicle data and road network data corresponding to a plurality of monitoring points in the preset area may be obtained by the management platform 230, and the total amount of exhaust emission in the preset area may be determined through processing the current monitoring data, the vehicle data and the road network data in the preset area by a third model including Graph Neural Network (GNN).

The road network data may refer to road network data in the field of transportation, such as electronic maps. The road network data may be obtained through the GPS system.

In some embodiments, the third model may be a machine learning model. In some embodiments, the third model may include GNN and a fusion layer which are interconnected. The fusion layer may be NN.

The amount of exhaust emission of each sampled road segment may be determined through processing the road network graph structure data by the GNN.

The road network graph structure data in the preset area may include nodes and edges between the nodes. Each node may correspond to the location of each road monitoring system in the preset area. The node attributes may reflect the vehicle information (such as vehicle type, vehicle speed, etc.) corresponding to the locations of the road monitoring systems within a period of time. The edges may correspond to roads in the preset area. The edge attributes may reflect the lengths of corresponding roads. In some embodiments, the nodes connected by an edge may be the nodes corresponding to the locations of the two road monitoring systems connected by the corresponding road, and the direction of the edge may be the direction in which the vehicle is traveling.

In some embodiments, the road network graph structure data may be determined by monitoring data, vehicle data, and road network data of corresponding monitoring points of the sampled road segments in the preset area. The nodes, edges and edge attributes in the road network graph structure data may be determined according to the road network data.

The input of the GNN may be the road network graph structure data of the target area, and each edge of the GNN may output the amount of exhaust emission of each sampled road segment in each preset area. For example, the amount of exhaust emission of each sampled road segment may be represented as vehicle information of each node and edge. The output of each edge of the GNN may be input to the fusion layer, and the fusion layer may output the total amount of exhaust emission in the preset area.

In some embodiments, the GNN and fusion layer may be trained separately.

In some embodiments, the GNN model may be determined through training an initial GNN model based on training data. The initial GNN model may refer to a GNN model with no parameters set. The training data may include training samples and training labels, wherein the training samples may be historical road network graph structure data determined based on historical data, and the training labels may be the historical amount of exhaust emission of each sampled road segment. The training samples with the labels may be input into the initial GNN model, and the parameters of the initial GNN model may be updated through training. When the preset conditions are satisfied, the training ends, and the trained GNN model is obtained.

In some embodiments, the nodes and edges of the historical road network graph structure data may be the same as or similar to those of the road network graph structure data, and the specific attributes of nodes and edges may be determined based on the historical vehicle information and historical length of road corresponding to the location of the road monitoring system over a period of time.

In some embodiments, the fusion layer may be determined through training the initial fusion layer based on training data. The initial fusion layer may refer to a fusion layer with no parameters set. The training data may include training samples and training labels, wherein the training samples may be the historical amount of exhaust emission of each sampled road segment within the preset area, and the training labels may be the historical total amount of exhaust emission in the preset area. The training samples with the labels may be input into the initial fusion layer, and the parameters of the initial fusion layer may be updated through training. When the preset conditions are satisfied, the training ends, and the trained fusion layer is obtained.

In some embodiments, the GNN and fusion layer may be obtained through joint training.

In some embodiments, the third model may train the GNN and fusion layer based on a large amount of labeled training data. Specifically, the labeled training data, that is, the historical road network graph structure data determined based on the historical data, may be input into the GNN, and the historical amount of exhaust emission of each sampled road section output by the GNN may be obtained. Then the historical amount of exhaust emission of each sampled road segment may be input into the fusion layer. The parameters of the GNN and fusion layer may be updated through training until the trained GNN and fusion layer meet the preset conditions, and the trained GNN and fusion layer are obtained. The preset conditions may be that the loss function is smaller than the threshold, converges, or the training cycle reaches the threshold.

In the third model shown in some embodiments of the present disclosure, when determining the total amount of exhaust emission in the preset area, the flow of vehicles at various intersections and roads is considered. Therefore, the determined total amount of exhaust emission of the preset area is more in line with the actual situation, and the accuracy of predicting the total amount of exhaust emission of the preset area is improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for managing exhaust emission in a smart city based on Internet of Things, wherein the method is implemented based on a system for managing exhaust emission in a smart city based on Internet of Things, wherein the system is part of a server or implemented by the server, the server includes a processing device, the processing device is used to obtain and analyze collected information, the system includes a user platform, a service platform, a management platform, a sensor network platform and one or more object platforms, wherein the user platform is configured to receive query requirements for traffic information initiated by users and send the query requirements to the service platform, the user platform is also configured to receive vehicle limit information sent by the service platform and feed the vehicle limit information back to the users, the service platform is configured to communicate the query requirements to the management platform and receive the vehicle limit information sent by the management platform, the management platform is configured to receive the query requirements sent by the service platform, the management platform is also configured to generate query instructions and issue the query instructions to the sensor network platform; the sensor network platform is a platform that realizes interaction between the management platform and the one or more object platforms, the sensor network platform is configured to receive the query instructions sent by the management platform and send the query instructions to the one or more object platforms, and the method is executed by the management platform, the method comprising:

obtaining current monitoring data in a preset area collected by the one or more object platforms through the sensor network platform, wherein the sensor network platform includes one main platform of the sensor network platform and at least one sub-platform of the sensor network platform, the at least one sub-platform of the sensor network platform being in one-to-one correspondence with the one or more object platforms, storing and processing the current monitoring data collected by the one or more object platforms, and transmitting processed information to the main platform of the sensor network platform, the main platform of the sensor network platform transmitting the processed information to the management platform, the at least one sub-platform of the sensor network platform corresponding to at least one regional location within the preset area, determining vehicle information based on the current monitoring data, wherein the vehicle information includes at least one of basic vehicle information, vehicle flow information, vehicle speed information, and vehicle type distribution information, determining a total amount of exhaust emission in the preset area based on the vehicle information, and determining the vehicle limit information based on the total amount of exhaust emission, comprising:

determining pollution index information through processing the total amount of exhaust emission in the preset area and weather information in the preset area by a first model, and determining the vehicle limit information based on the pollution index information, wherein the determining the vehicle limit information based on the pollution index information comprises:

determining whether an air pollution index, in the pollution index information, is in a boundary interval of a preset threshold of the air pollution index, in response to the determination that the air pollution index is in the boundary interval, re-determining the pollution index information, and determining the vehicle limit information based on the re-determined pollution index information, wherein the first model is a Neural Network Model, which is obtained by a training process including:

obtaining a plurality of first training samples with first labels, wherein the first training samples include a historical total amount of exhaust emission in the preset area and historical weather information in the preset area, the first labels include an air pollution index of a subsequent preset time period, inputting the plurality of first training samples with the first labels into an initial first model, and updating parameters of the initial first model through training iterations based on the plurality of first training samples with the first labels, stopping the training and obtaining the first model when a loss function of the initial first model meets a first preset condition, and sending the vehicle limit information to the user platform through the service platform by the management platform.

2. The method of claim 1, wherein the preset area includes a plurality of road segments, each road segment of the plurality of road segments includes at least one monitoring point, the determining vehicle information based on the current monitoring data comprises:

obtaining the current monitoring data corresponding to a monitoring point in a road segment in the preset area collected by the one or more object platforms through the sensor network platform, and determining the vehicle information from the monitoring point through processing the current monitoring data by a data acquisition model, wherein the data acquisition model is a machine learning model.

3. The method of claim 2, wherein the data acquisition model includes an image feature extraction layer, a sequence feature extraction layer, nad a data prediction layer.

4. The method of claim 1, wherein the determining the total amount of exhaust emission in the preset area based on the vehicle information comprises:

through processing vehicle information of each sampled road segment of a plurality of sampled road segments in the preset area by a second model, determining an amount of exhaust emission corresponding to each sampled road segment, wherein the second model is a Neural Network Model, which is obtained by a training process including:

obtaining a plurality of second training samples with second labels, wherein the second training samples include historical vehicle information of each sampled road segment of the plurality of sampled road segments in the preset area, the second labels include a historical amount of exhaust emission corresponding to each sampled road segment, inputting the plurality of second training samples with the second labels into an initial second model, updating parameters of the initial second model through training iterations based on the plurality of second training samples with the second labels, and stopping the training and obtaining the second model when a loss function of the initial second model meets a second preset condition, and determining the total amount of exhaust emission in the preset area based on the amount of exhaust emission corresponding to each sampled road segment.

5. The method of claim 4, wherein the determining the total amount of exhaust emission in the preset area comprises:
determining an amount of exhaust emission of other road segments in the preset area based on road segment similarities between each sampled road segment and other road segments in the preset area, and
determining the total amount of exhaust emission in the preset area through fusing the amount of exhaust emission of the plurality of sampled road segments in the preset area and the amount of other road segments in the preset area.

6. The method of claim 5, wherein the road segment similarities are determined by:
constructing a feature vector corresponding to each road segment based on road segment feature information of the plurality of sampled road segments in the preset area and road segment feature information of the other road segments in the preset area, wherein both of the road segment feature information includes location data, a length of each road segment, one-way or two-way road segment, and a surrounding environment of each road segment, and
calculating the road segment similarities between the plurality of sampled road segments in the preset area and the other road segments in the preset area based on the feature vector corresponding to each road segment.

7. The method of claim 1, wherein the determining the total amount of exhaust emission in the preset area based on the vehicle information comprises:
obtaining current monitoring data, vehicle data, and road network data corresponding to a plurality of monitoring points in the preset area,
determining road network graph structure data based on the current monitoring data, the vehicle data, and the road network data corresponding to the plurality of monitoring points in the preset area; and
determining the total amount of exhaust emission in the preset area through processing the road network graph structure data by a third model, the third model including is a Neural Network Model, which includes a Graph Neural Network (GNN) and a fusion layer that are interconnected the fusion layer is a Neural Network,
wherein the determining the total amount of exhaust emission in the preset area through processing the road network graph structure data by the third model comprises:
inputting the road network graph structure data into the GNN, wherein each edge of the GNN outputs an amount of exhaust emission of each sampled road segment in the preset area,
inputting the amount of exhaust emission of each sampled road segment in the preset area into the fusion layer, and outputting the total amount of exhaust emission in the preset area from the fusion layer:
wherein the third model is obtained by a training process including:
obtaining a plurality of third training samples with third labels, wherein the third training samples include historical road network graph structure data the third labels include an historical amount of exhaust emission of each sampled road segment in the preset area,
inputting the plurality of third training samples with the third labels into an initial Graph Neural Network,
updating parameters of the initial Graph Neural Network through training iterations based on the plurality of third training samples with the third labels, and stopping the training and obtaining the Graph Neural Network when a loss function of the initial Graph Neural Network meets a third preset condition, and
obtaining a plurality of fourth training samples with fourth labels, wherein the fourth training samples include the historical amount of exhaust emission of each sampled road segment in the preset area, the fourth labels include a historical total amount of exhaust emission in the preset area,
inputting the plurality of fourth training samples with the fourth labels into an initial fusion layer,
updating parameters of the initial fusion layer through training iterations based on the plurality of fourth training samples with the fourth labels, and stopping the training and obtaining the fusion layer when a loss function of the initial fusion layer meets a fourth preset condition.

8. A system for exhaust emission in a smart city based on Internet of Things, wherein the system is part of a server or implemented by the server, the server includes a processing device, the processing device is used to obtain and analyze collected information, the system includes a user platform, a service platform, a management platform, a sensor network platform and one or more object platforms, wherein the user platform is configured to receive query requirements for traffic information initiated by users and send the query requirements to the service platform, the user platform is also configured to receive vehicle limit information sent by the service platform and feed the vehicle limit information back to the users, the service platform is configured to communicate the query requirements to the management platform and receive the vehicle limit information sent by the management platform, the management platform is configured to receive the query requirements sent by the service platform, the management platform is also configured to generate query instructions and issue the query instructions to the sensor network platform; the sensor network platform is a platform that realizes interaction between the management platform and the one or more object platforms, the sensor network platform is configured to receive the query instructions sent by the management platform and send the query instructions to the one or more object platforms, and
the management platform is configured to execute the following operations:
obtaining current monitoring data in a preset area collected by the one or more object platforms through the sensor network platform, wherein the sensor network platform includes one main platform of the sensor network platform and at least one sub-platform of the sensor network platform, the at least one sub-platform of the sensor network platform being in one-to-one correspondence with the one or more object platforms, storing and processing the current monitoring data collected by the one or more object platforms, and transmitting processed information to the main platform of the sensor network platform, the main platform of the sensor network platform transmitting the processed information to the management platform, the at least one sub-platform of the sensor network platform corresponding to at least one regional location within the preset area,
determining vehicle information based on the current monitoring data, wherein the vehicle information includes at least one of basic vehicle information, vehicle flow information, vehicle speed information, and vehicle type distribution information, determining a total amount of exhaust emission in the preset area based on the vehicle information, and determining the vehicle limit information based on the total amount of exhaust emission, wherein to determine the vehicle limit information based on the total amount of exhaust emission, the management platform is further configured to execute the following operations:

determining pollution index information through processing the total amount of exhaust emission in the preset area and weather information in the preset area by a first model, and determining the vehicle limit information based on the pollution index information, wherein the determining the vehicle limit information based on the pollution index information comprises:

determining whether an air pollution index, in the pollution index information, is in a boundary interval of a preset threshold of the air pollution index, in response to the determination that the air pollution index is in the boundary interval, re-determining the pollution index information, and determining the vehicle limit information based on the re-determined pollution index information, wherein the first model is a Neural Network Model, which is obtained by a training process including:

obtaining a plurality of first training samples with first labels, wherein the first training samples include a historical total amount of exhaust emission in the preset area and historical weather information in the preset area, the first labels include an air pollution index of a subsequent preset time period, inputting the plurality of first training samples with the first labels into an initial first model, and updating parameters of the initial first model through training iterations based on the plurality of first training samples with the first labels, stopping the training and obtaining the first model when a loss function of the initial first model meets a first preset condition, and sending the vehicle limit information to the user platform through the service platform by the management platform.

9. The system of claim 8, wherein the preset area includes a plurality of road segments, each road segment of the plurality of road segments includes at least one monitoring point, and the management platform is further configured to:

obtain the current monitoring data corresponding to a monitoring point in a road segment in the preset area collected by the one or more object platforms through the sensor network platform, and determine the vehicle information from the monitoring point through processing the current monitoring data by a data acquisition model, wherein the data acquisition model is a machine learning model.

10. The system of claim 9, wherein the data acquisition model includes an image feature extraction layer, a sequence feature extraction layer, and a data prediction layer.

11. The system of claim 8, wherein the management platform is further configured to:

through processing vehicle information of each sampled road segment of a plurality of sampled road segments in the preset area by a second model, determining an amount of exhaust emission corresponding to each sampled road segment, wherein the second model is a Neural Network Model, which is obtained by a training process including:

obtaining a plurality of second training samples with second labels, wherein the second training samples include historical vehicle information of each sampled road segment of the plurality of sampled road segments in the preset area, the second labels include a historical amount of exhaust emission corresponding to each sampled road segment, inputting the plurality of second training samples with the second labels into an initial second model, updating parameters of the initial second model through training iterations based on the plurality of second training samples with the second labels, and stopping the training and obtaining the second model when a loss function of the initial second model meets a second preset condition, and determine the total amount of exhaust emission in the preset area based on the amount of exhaust emission corresponding to each sampled road segment.

12. The system of claim 11, wherein the determining the total amount of exhaust emission in the preset area comprises:

determining an amount of exhaust emission of other road segments in the preset area based on road segment similarities between each sampled road segment and other road segments in the preset area, and determine the total amount of exhaust emission in the preset area through fusing the amount of exhaust emission of the plurality of sampled road segments in the preset area and the amount of the other road segments in the preset area.

13. The system of claim 12, wherein the road segment similarities are determined by:

constructing a feature vector corresponding to each road segment based on road segment feature information of the plurality of sampled road segments in the preset area and road segment feature information of the other road segments in the preset area, wherein both of the road segment feature information includes location data, a length of each road segment, one-way or two-way road segment, and a surrounding environment of each road segment, and calculating the road segment similarities between the plurality of sampled road segments in the preset area and the other road segments in the preset area based on the feature vector corresponding to each road segment.

14. The system of claim 8, wherein to determine the total amount of exhaust emission in the preset area based on the vehicle information comprises:

obtain current monitoring data, vehicle data, and road network data corresponding to a plurality of monitoring points in the preset area, determining road network graph structure data based on the current monitoring data, the vehicle data, and the road network data corresponding to the plurality of monitoring points in the preset area; and determine the total amount of exhaust emission in the preset area through processing the road network graph structure data by a third model, the third model including is a Neural Network Model, which includes a Graph Neural Network (GNN) and a fusion layer that are interconnected the fusion layer is a Neural Network, wherein the determining the total amount of exhaust emission in the preset area through processing the road network graph structure data by the third model comprises:

inputting the road network graph structure data into the GNN, wherein each edge of the GNN outputs an amount of exhaust emission of each sampled road segment in the preset area, inputting the amount of exhaust emission of each sampled road segment in the preset area into the fusion layer, and outputting the total amount of exhaust emission in the preset area from the fusion layer:

wherein the third model is obtained by a training process including:

obtaining a plurality of third training samples with third labels, wherein the third training samples include historical road network graph structure data, the third labels include a historical amount of exhaust emission of each sampled road segment in the preset area, inputting the plurality of third training samples with the third labels into an initial Graph Neural Network, updating parameters of the initial Graph Neural Network through training iterations based on the plurality of third training samples with the third labels, and stopping the training and obtaining the Graph Neural Network when a loss function of the initial Graph Neural Network meets a third preset condition, and obtaining a plurality of fourth training samples with fourth labels, wherein the fourth training samples include the historical amount of exhaust emission of each sampled road segment in the preset area, the fourth labels include a historical total amount of exhaust emission in the preset area, inputting the plurality of fourth training samples with the fourth labels into an initial fusion layer, updating parameters of the initial fusion layer through training iterations based on the plurality of fourth training samples with the fourth labels, and stopping the training and obtaining the fusion layer when a loss function of the initial fusion layer meets a fourth preset condition.

* * * * *